United States Patent
Goto

(10) Patent No.: US 9,434,324 B2
(45) Date of Patent: Sep. 6, 2016

(54) GARNISH WITH MOLDING AND VEHICLE DOOR MOUNTED WITH SAME

(71) Applicant: HONDA MOTOR CO., LTD., Tokyo (JP)

(72) Inventor: Joji Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/423,257

(22) PCT Filed: Jun. 20, 2013

(86) PCT No.: PCT/JP2013/066928
§ 371 (c)(1),
(2) Date: Feb. 23, 2015

(87) PCT Pub. No.: WO2014/034232
PCT Pub. Date: Mar. 6, 2014

(65) Prior Publication Data
US 2015/0203055 A1    Jul. 23, 2015

(30) Foreign Application Priority Data
Aug. 31, 2012    (JP) .............................. 2012-191134

(51) Int. Cl.
*E04C 2/38*      (2006.01)
*B60R 13/04*      (2006.01)
(Continued)

(52) U.S. Cl.
CPC ............... *B60R 13/04* (2013.01); *B32B 3/263* (2013.01); *B32B 3/266* (2013.01); *B32B 15/04* (2013.01);
(Continued)

(58) Field of Classification Search
CPC ....... B32B 15/04; B32B 3/266; B32B 3/263; B32B 2605/00; B32B 2250/02; B60J 10/02
USPC .................. 52/716.5, 716.6, 716.7; 296/1.08
See application file for complete search history.

(56) References Cited

U.S. PATENT DOCUMENTS

| 1,823,541 | A | * | 9/1931 | Herron | ................... | B60R 13/04 296/135 |
| 2,787,493 | A | * | 4/1957 | Brown | ............... | B60R 13/0206 24/293 |
| 3,634,991 | A | * | 1/1972 | Barton, Jr. | ........... | B60J 10/0051 24/297 |

(Continued)

FOREIGN PATENT DOCUMENTS

| AU | WO 02096715 A1 * 12/2002 ............. B60R 13/04 |
| JP | S57-37046     2/1982 |

(Continued)

OTHER PUBLICATIONS

International Search Report, Date of mailing Sep. 17, 2013.
(Continued)

*Primary Examiner* — Adriana Figueroa
(74) *Attorney, Agent, or Firm* — Rankin, Hill & Clark LLP

(57) ABSTRACT

A garnish with a molding includes a garnish main body and a metal molding overlapping the outer surface of the garnish main body. At the outer surface of the garnish main body, a groove is formed extending in the lengthwise direction of the garnish main body, and at least one lateral wall at both sides of the groove is formed as an inclined surface inclined in the direction of the groove width widening from the groove bottom to the groove opening. The molding has: a surface extending in the lengthwise direction of the garnish main body along the outer surface of the garnish main body; and a flange that rises up from one edge in the widthwise direction of the surface towards the groove, and that is fitted in the groove and contacts the inclined surface.

10 Claims, 13 Drawing Sheets

(51) Int. Cl.
*B32B 3/26* (2006.01)
*B32B 15/04* (2006.01)

(52) U.S. Cl.
CPC ........ *B32B 2250/02* (2013.01); *B32B 2605/00* (2013.01); *Y10T 428/24322* (2015.01); *Y10T 428/24612* (2015.01)

(56) References Cited

U.S. PATENT DOCUMENTS

| | | | | | |
|---|---|---|---|---|---|
| 3,738,074 | A | * | 6/1973 | Tucker | B60J 10/0062 24/297 |
| 4,055,285 | A | * | 10/1977 | Bott | B60R 9/04 224/326 |
| 4,066,285 | A | * | 1/1978 | Hall | B60R 13/04 280/770 |
| 4,278,286 | A | * | 7/1981 | Kiba | B60J 10/0051 296/93 |
| 4,388,355 | A | * | 6/1983 | Ikemizu | B60R 13/04 293/1 |
| 4,709,525 | A | * | 12/1987 | Adell | E04F 19/026 293/128 |
| 4,838,004 | A | * | 6/1989 | Adell | E04F 19/026 293/128 |
| 4,878,273 | A | * | 11/1989 | West | B60R 13/04 24/289 |
| 5,134,829 | A | * | 8/1992 | Kress | F16B 5/126 52/716.6 |
| 5,186,509 | A | * | 2/1993 | Tyves | F16B 5/126 293/128 |
| 5,188,408 | A | * | 2/1993 | Berdan | F16B 5/126 293/128 |
| 5,783,020 | A | * | 7/1998 | Kress | B60R 13/04 156/291 |
| 6,349,662 | B1 | * | 2/2002 | Limansky | B63B 59/02 114/219 |
| 2009/0007511 | A1 | * | 1/2009 | Hause | B60J 10/0051 52/312 |

FOREIGN PATENT DOCUMENTS

| | | |
|---|---|---|
| JP | S60-072756 U | 5/1985 |
| JP | S64-22582 | 2/1989 |
| JP | 2004034760 | 2/2004 |
| JP | 2005104367 | 4/2005 |
| JP | 4736452 | 5/2011 |
| JP | 2012-096720 | 5/2012 |

OTHER PUBLICATIONS

Japanese Office Action dated Jun. 10, 2016 and partial English Translation, 7 pages.

\* cited by examiner

GARNISH WITH MOLDING AND VEHICLE DOOR MOUNTED WITH SAME

TECHNICAL FIELD

The present invention relates to an improvement in a garnish with a molding.

BACKGROUND ART

Vehicle doors mounted with a garnish and a molding as decoration members on an outside surface thereof are widely known, for example, as disclosed in Patent Literature 1.

In Patent Literature 1, a vehicle door includes a garnish body fitted to a part of a door sash, and a molding fitted in grooves formed on an outer surface of the garnish body.

More specifically, the molding is a press-formed product of a sheet metal, and has opposite ends thereof bent to form flanges. The garnish body is a resin molded product molded by a molding die, and has the grooves in which the flanges are fitted. Each of the grooves has, generally, a draft of the molding die formed on a side wall thereof. That is, at least one of opposite side walls of the groove is formed as an inclined surface inclined in a direction such that a groove width increases from a groove bottom to a groove opening. By pressing the flanges into the grooves having the inclined side wall, the molding is attached to the garnish body. In this case, each of the flanges is elastically deformed along the side wall of the groove.

Each of the flanges abutting on the side wall, however, has a restoration force to restore the original shape. By the restoration force acting on the side wall, a component force is generated on the molding in a direction of lifting from the garnish body. If the molding is lifted slightly from the garnish body, a slight gap visible from outside might occur between an end part of the molding and the groove opening. Such a gap disadvantageously impairs an external appearance of the vehicle door.

PRIOR ART LITERATURE

Patent Literature

Patent Literature 1: Japanese Patent Publication No. 4736452

SUMMARY OF INVENTION

Technical Problems

It is therefore an object of the present invention to provide a garnish with a molding having an enhanced external appearance.

Solutions to Problems

According to a first aspect of the invention, there is provided a garnish with a molding including a garnish body molded by a molding die, and a metal molding overlapping an outer surface of the garnish body, characterized in that: the garnish body has a groove formed on the outer surface to extend in a lengthwise direction of the garnish body; at least one of opposite side walls of the groove is formed as an inclined surface inclined in a direction such that a groove width increases from a groove bottom to a groove opening; the molding has an obverse surface section extending along the outer surface of the garnish body in the lengthwise direction of the garnish body, and a flange raised up from one edge in a widthwise direction of the obverse surface section toward the groove to be fitted in the groove and brought into contact with the inclined surface; and a first angle formed by the obverse surface section and the flange is set to be smaller than a second angle formed by an extension line of the groove bottom and the inclined surface.

Preferably, according to a second aspect, the garnish body has a through-hole bored therein in a direction from the groove bottom to a backside surface of the garnish body, the flange has a projection formed on at least part thereof to pass through the through-hole and project beyond the backside surface of the garnish body, and the projection is clinched to the backside surface of the garnish body.

Preferably, according to a third aspect, the projection is clinched to the backside surface of the garnish body in a manner such that a distal end of the projection is bent along the backside surface of the garnish body in a direction toward the inclined surface.

Preferably, according to a fourth aspect, the molding further has a fastening projection formed on the obverse surface section and extending from the other edge in the widthwise direction of the obverse surface section toward a corresponding edge in a widthwise direction of the garnish body, and a distal end of the fastening projection extends from the edge of the garnish body to the backside surface of the garnish body and is clinched to the garnish body by being bent along the backside surface of the garnish body in a direction same as the direction in which the projection is bent in clinching.

According to a fifth aspect of the invention, there is provided a vehicle door provided with the garnish with the molding of any one of the second to fourth aspects, characterized in that: the vehicle door includes a door body, and a door sash attached above the door body; the door sash is provided with a panel support frame joined to an upper part of the door body to support a window panel; the garnish body is mounted on a surface of the panel support frame; the panel support frame has a lower side part extending along an upper edge of the door body, a lateral side part extending upward from an end of the lower side part, and an upper side part extending from an upper end of the lateral side part substantially in the same direction as the lower side part; the groove extends over the lower side part, the lateral side part and the upper side part of the panel support frame; the groove has a groove lower side part corresponding to the lower side part of the panel support frame, and a groove upper side part corresponding to the upper side part of the panel support frame; the flange has a flange lower side part corresponding to the groove lower side part, and a flange upper side part corresponding to the groove upper side part; a distance from the flange upper side part to the flange lower side part is set to be greater than a distance from the groove upper side part to the groove lower side part; and the flange upper side part is in contact with the groove upper side part.

Preferably, according to a sixth aspect, the vehicle door further includes a beltline molding attached along the upper edge of the door body, and an outer panel forming an outside part of the door body, a distal end of the flange lower side part and a distal end of the beltline molding are butted to each other, the beltline molding is provided with at a lower edge thereof a beltline lip formed to abut on the outer panel, the garnish body has at a lower end thereof a garnish lip formed integrally with the garnish body to abut on the outer panel, and the garnish lip is formed of resin harder than the beltline lip, and has a curved section that is greatly curved more than the beltline lip toward the inside of a vehicle.

Advantageous Effects of Invention

According to the first aspect of the invention, the first angle formed by the obverse surface section and the flange is set to be smaller than the second angle formed by the extension line of the groove bottom and the inclined surface. Since the first angle is smaller, the molding is in contact with the groove at a position adjacent to a boundary between the flange and the obverse surface section. In other words, the flange is in contact with the inclined surface at a position adjacent to a base end of the flange, so that the molding will not easily be lifted by a restoration force of the flange. By thus preventing the molding from being lifted, the occurrence of a gap between the molding and the groove can be prevented. As a result, the garnish with the molding can have an enhanced external appearance with no occurrence of the gap.

According to the second aspect of the invention, the projection formed on the part of the flange passes through the through-hole formed in the garnish body, and projects beyond the backside surface of the garnish body to be clinched to the backside surface of the garnish body. By preventing the flange from being lifted in this manner, the flange can be stably fixed in the groove, so that the occurrence of the gap can be more surely prevented. Further, the flange can be clinched at a position other than an end part of the garnish body.

According to the third aspect of the invention, the projection is clinched in such a manner that the distal end of the projection is bent along the backside surface of the garnish body in the direction toward the inclined surface. With the projection being bent toward the inclined surface, the flange can be expanded toward the inclined surface, whereby the occurrence of a gap between the inclined surface and the flange can be efficiently prevented.

According to the fourth aspect of the invention, the molding has the fastening projection formed on the obverse surface section thereof, and the distal end of the fastening projection is bent along the backside surface of the garnish body in the direction same as the direction in which the projection is bent in clinching, whereby the fastening projection is clinched thereto. In other words, the projection and the fastening projection are bent in the same direction with each other. With this configuration, the projection and the fastening projection can be clinched at the same time, which leads to improved productivity.

According to the fifth aspect of the invention, the distance from the flange upper side part to the flange lower side part is set to be greater than the distance from the groove upper side part to the groove lower side part. That is, the flange is formed to be longer than the groove. Since the flange is an elastic member, the flange can be fitted in the groove even when the flange is formed to be longer than the groove. By thus forming the flange to be longer than the groove, a product dimensional error that inevitably occurs can be absorbed.

Further, according to the fifth aspect of the invention, the flange upper side part is in contact with the groove upper side part. When the entire flange cannot be brought into contact with the entire groove due to an inevitable product dimensional error, the flange upper side part is brought into contact with the groove upper side part. It is thereby possible to prevent the occurrence of a gap at the upper side parts that are conspicuous, while absorbing the product dimensional error at the lower side parts that are less conspicuous.

According to the sixth aspect of the invention, the garnish body has the garnish lip formed integrally with the garnish body to abut on the outer panel. By forming the garnish lip integrally with the garnish body, the manufacturing cost of the parts can be reduced.

DESCRIPTION OF EMBODIMENT

Figure 1:
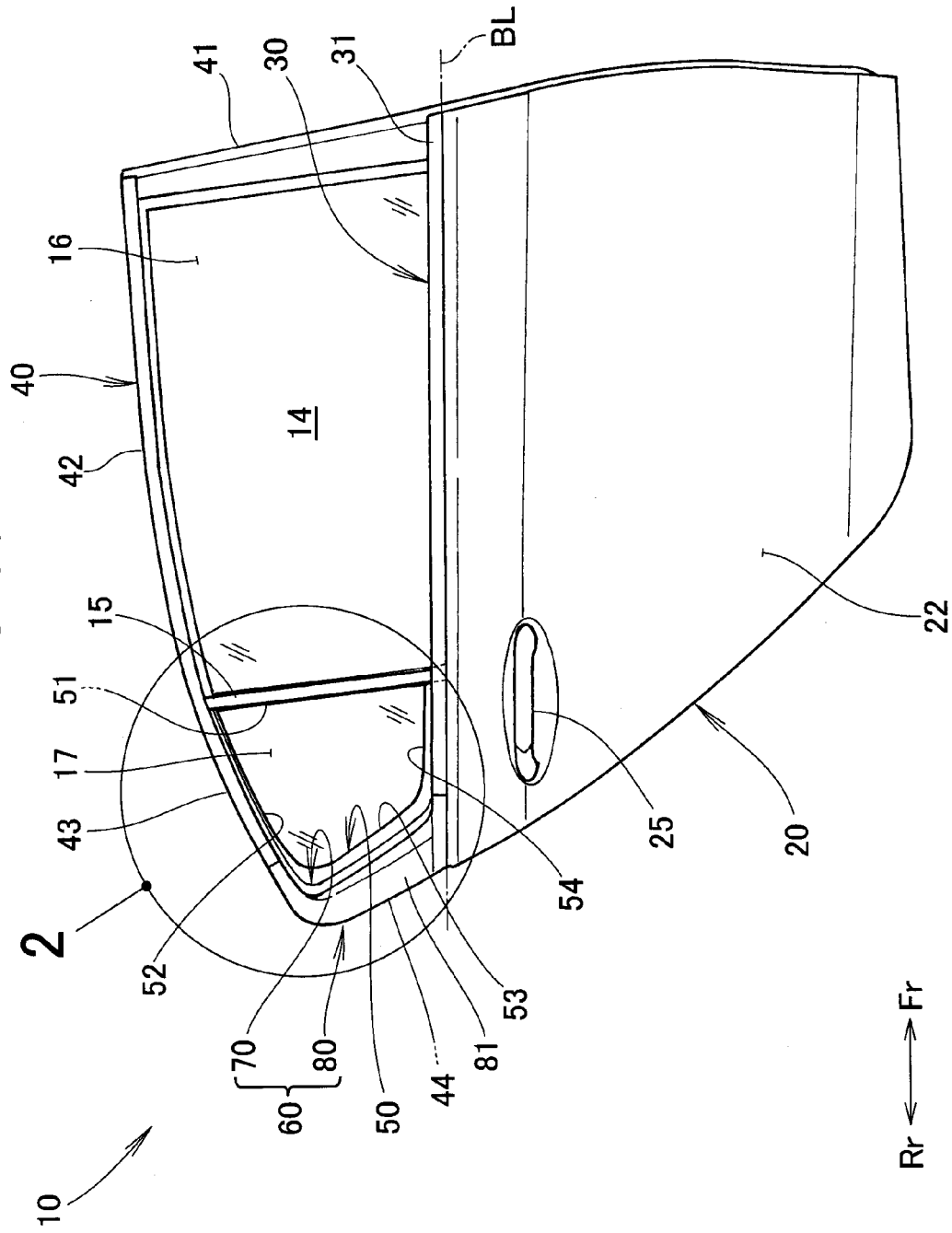
FIG. 1 is a view showing a vehicle door provided with a garnish with a molding according to the present invention as viewed from outside of a vehicle.

A certain preferred embodiment of the present invention will be described in detail below with reference to the accompanying drawings. In the following description, the terms "left" and "right" are used to refer to directions as viewed from a human operator or driver in a vehicle, and the terms "front" and "rear" are used to refer to directions with respect to an advancing direction of the vehicle. In the drawings, "Fr", "Rr", "In", "Out", "Up", and "Dw" indicate respectively "forward", "rearward", "inward (direction toward the inside of the vehicle)", "outward (direction toward the outside of the vehicle)", "upward", and "downward".

Embodiment

Figure 2:
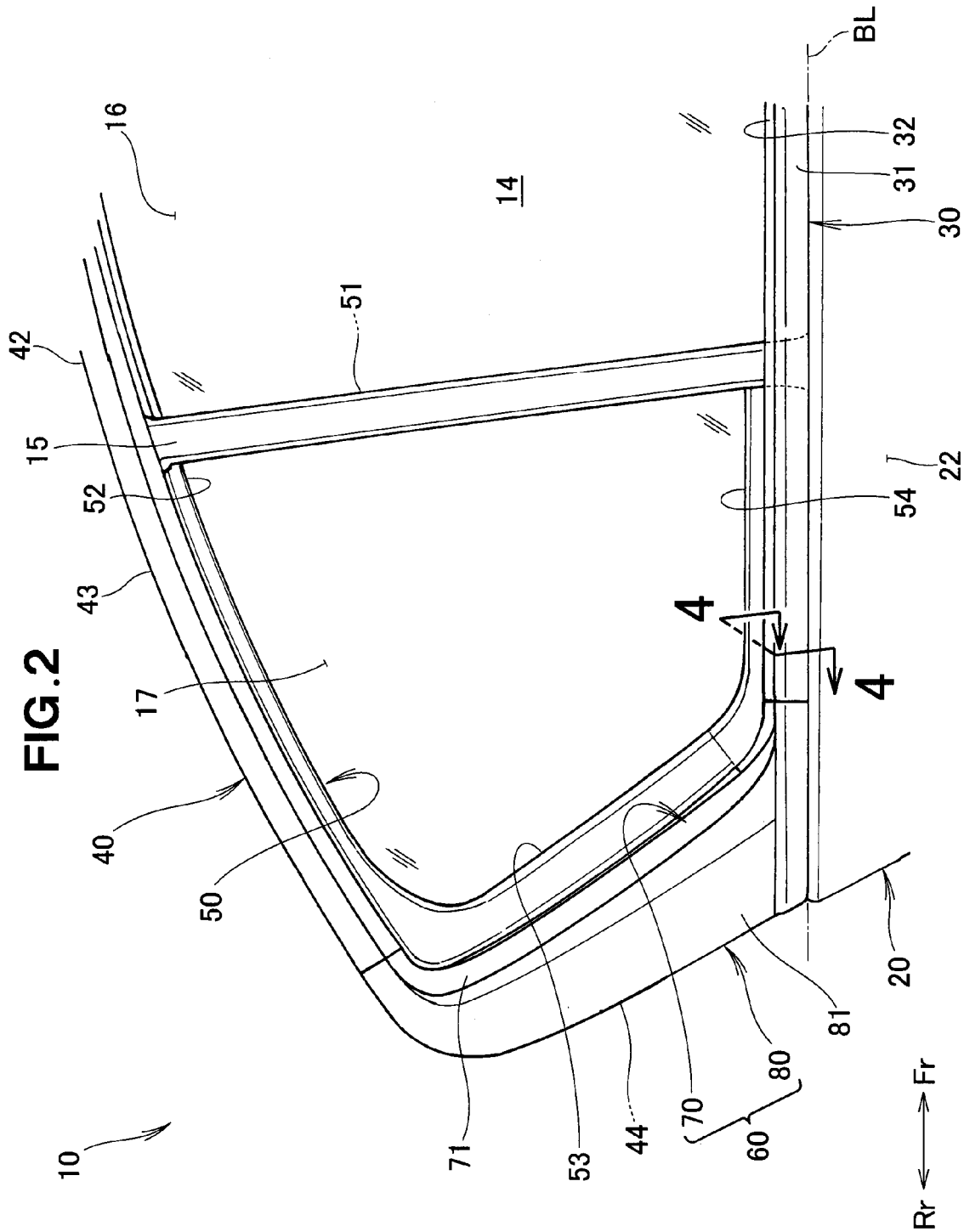
FIG. 2 is an enlarged view of section 2 of FIG. 1.
Figure 3:
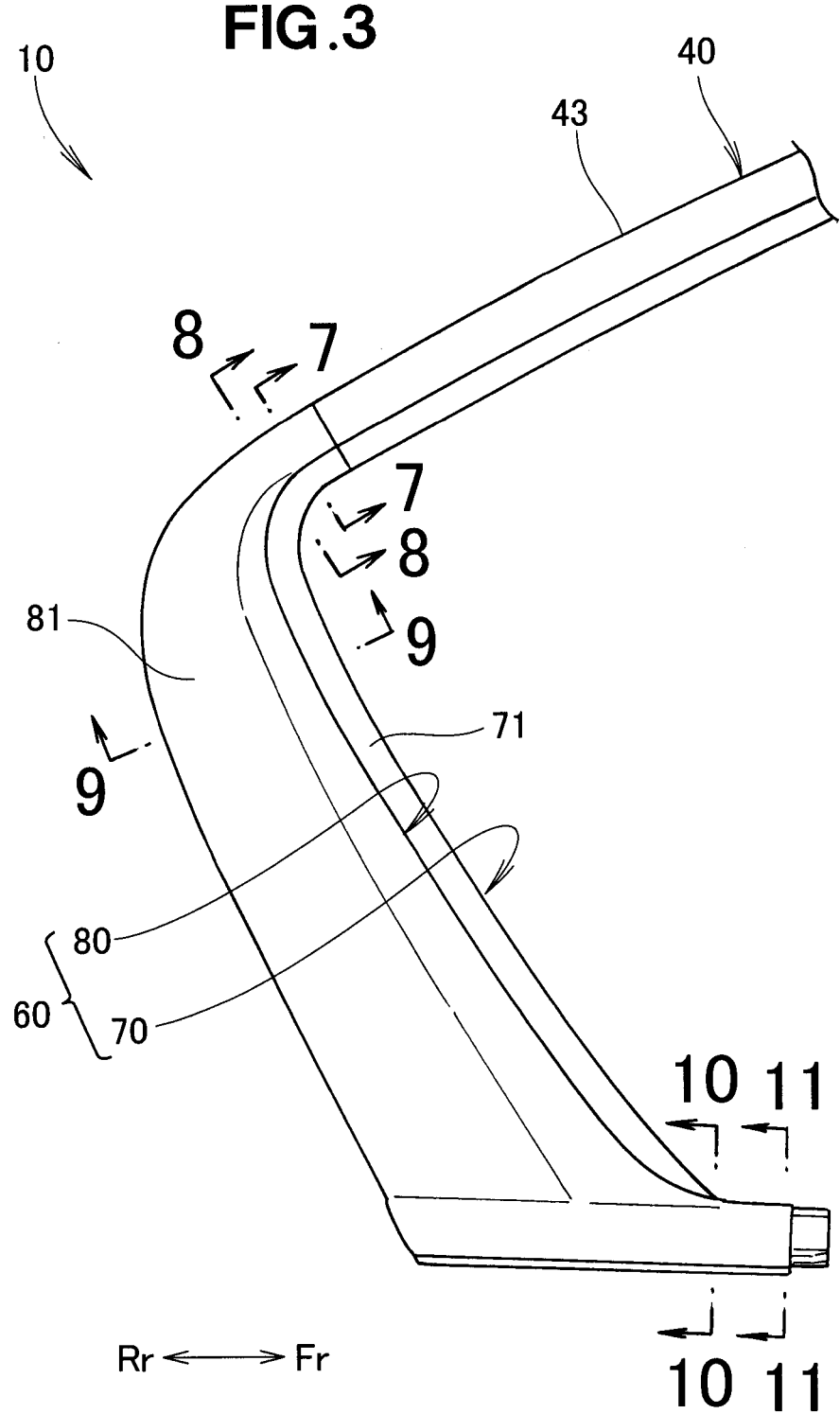
FIG. 3 is an enlarged view showing a part of the garnish with the molding of FIG. 2.

A vehicle door 10 shown in FIGS. 1 to 3 is a rear right door of a vehicle. The vehicle door 10 includes a door body 20 mounted in an openable/closable manner on a door opening formed in a rear part of a vehicle body, a beltline molding 30 attached along an upper edge of the door body 20, a door sash 40 arranged above the beltline molding 30, an auxiliary sash 15 partitioning a window opening 14 formed by the door sash 40 and the door body 20, a glass movable window panel 16 vertically movably attached forward of the auxiliary sash 15, a panel support frame 50 attached to an area enclosed by the auxiliary sash 15 and the door sash 40, a glass fixed window panel 17 having an outer periphery thereof fixed in the panel support frame 50, and a garnish 60 with a molding attached to an outer surface of the door sash 40 at a position rearward of the fixed window panel 17. The garnish 60 with the molding covers a part of an outer surface of the panel support frame 50.

A beltline BL shown in the drawings is a line extending along the upper edge of the door body 20 or a lower edge of the door sash 40. The beltline molding 30 is a decoration member extending along the beltline BL. The beltline molding 30 is attached to the door body 20.

Figure 4:
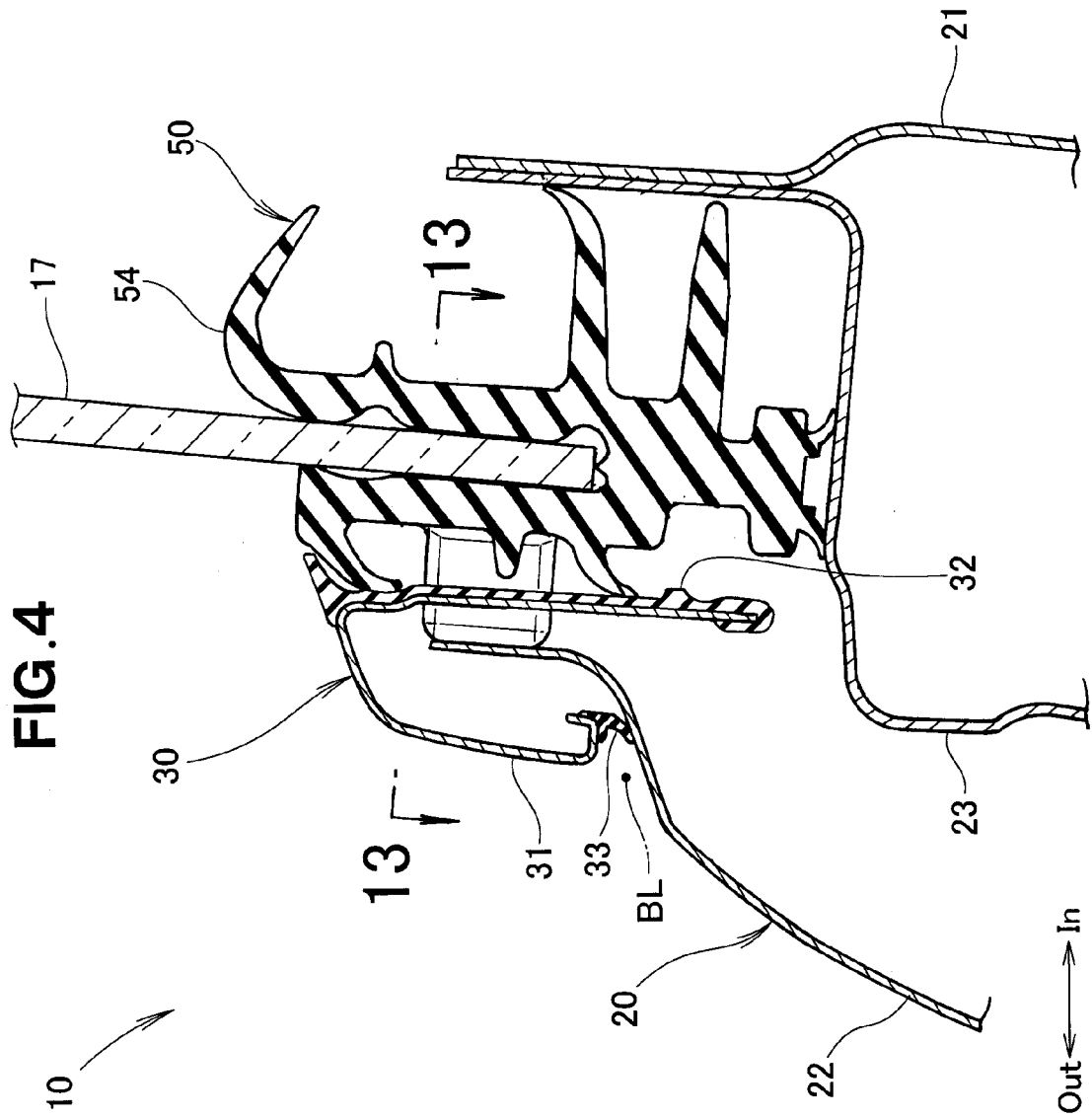
FIG. 4 is a cross-sectional view taken along line 4-4 of FIG. 2.

As shown in FIG. 4, the door body 20 includes an inner panel 21 facing the inside of the vehicle, an outer panel 22 constituting a design surface on the outside of the vehicle, and a stiffener 23 joined to an outer surface of the inner panel 21 to reinforce the inner panel 21. As shown in FIG. 1, a door handle 25, which is gripped by a driver to swing the vehicle door 10, is attached at a rear part of the outer panel 22.

As shown in FIG. 4, the beltline molding 30 includes a design surface part 31 arranged above the outer panel 22 and constituting an outer surface of the beltline molding 30, a T-shaped member 32 formed substantially in a T-shape and attached to the design surface part 31, and a beltline lip 33 attached to a lower part of the design surface part 31 and formed to have a distal end extending toward the outer panel 22.

As shown in FIGS. 1 and 2, the door sash 40 is a metal window frame formed to have a substantially pentagonal shape together with the beltline molding 30, and includes a front sash member 41 located forward of the movable window panel 16 and extending in a vertical direction, a front upper sash member 42 extending rearward from an upper end of the front sash member 41 to an upper part of the auxiliary sash 15, a rear upper sash member 43 extending obliquely downward from an rear end of the front upper sash member 42 along an upper edge of the fixed window panel 17, and a rear sash member 44 extending obliquely downward and forward from a rear end of the rear upper sash member 43 and covered by the garnish 60 with the molding.

The auxiliary sash 15 is a support-shaped member extending downward from a boundary between the front upper sash member 42 and the rear upper sash member 43. The auxiliary sash 15 has a lower end extending to a position overlapping with the beltline molding 30 as viewed in a thickness direction of the door. In other words, when the vehicle door 10 is viewed from outside, the lower end of the auxiliary sash 15 is covered by the beltline molding 30.

The panel support frame 50 is formed of a rubber material such as olefin-based thermoplastic elastomer (TPO). A gap between the fixed window panel 17 and the door body 20 is sealed by the panel support frame 50. The panel support frame 50 includes a front side part 51 extending in the vertical direction and covered by the auxiliary sash 15 as viewed from outside, an upper side part 52 extending obliquely rearward and downward from an upper end of the front side part 51, a lateral side part or rear side part 53 extending obliquely downward and forward from a rear end of the upper side part 52, and a lower side part 54 extending from a lower end of the rear side part 53 to a lower end of the front side part 51 along the beltline molding 30.

The panel support frame 50 is fitted to the entire outer periphery of the fixed window panel 17. The panel support frame 50 supporting the fixed window panel 17 is arranged above the door body 20. The fixed window panel 17 is thus arranged above the door body 20.

The garnish 60 with the molding is an exterior member formed substantially in a U-shape, and composed of a resin garnish main body or garnish body 70 attached to an outside of the door sash 40, and a metal molding 80 integrally attached to an outside of the garnish body 70. The molding 80 is a decoration member for the garnish body 70, and covers a large part of the garnish body 70.

Figure 5:
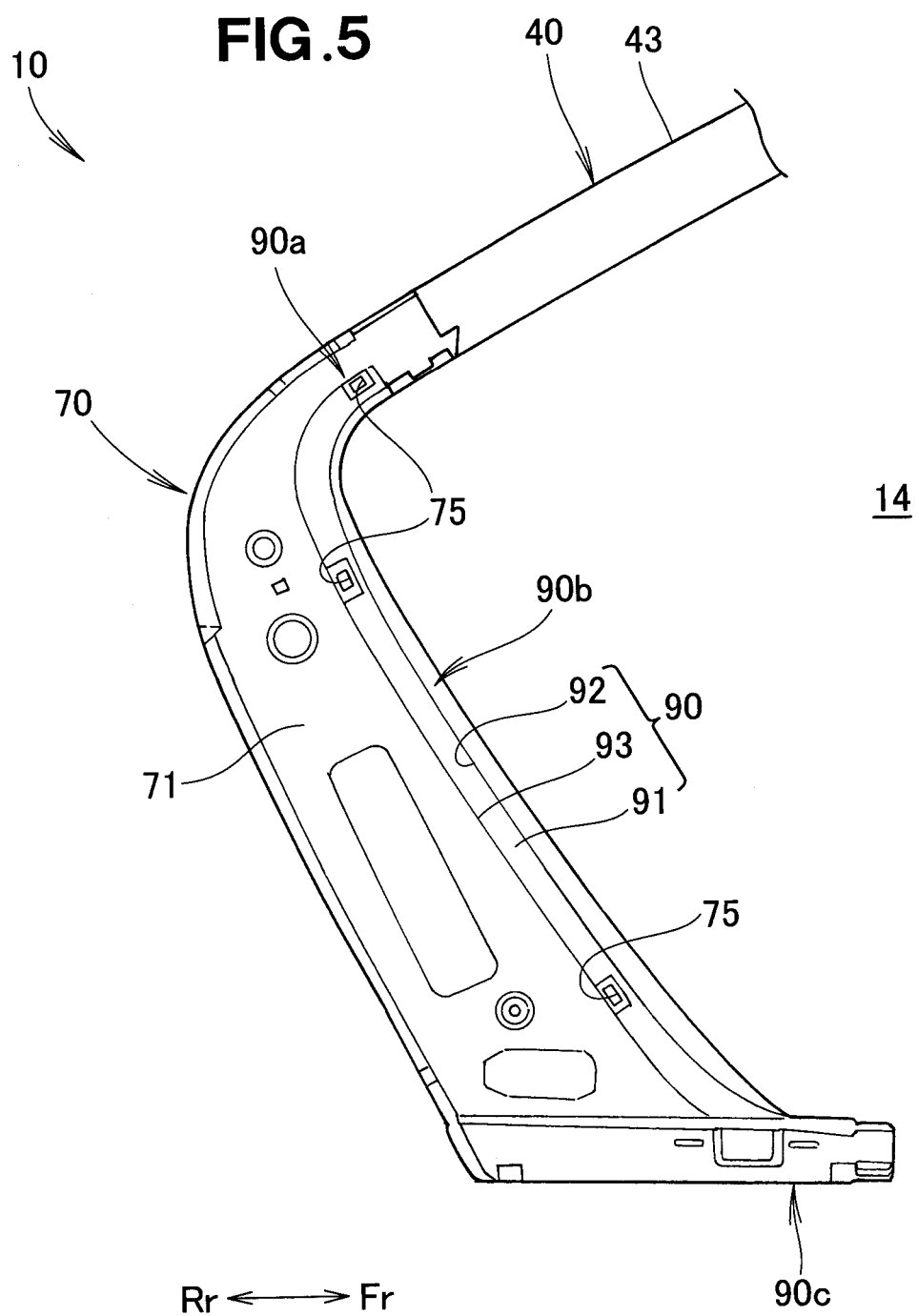
FIG. 5 is a view showing a garnish body of FIG. 3.

As shown in FIG. 5, the garnish body 70, which is a resin member molded by a molding die, is formed substantially in a U-shape. The garnish body 70 has a groove 90 formed on an outer surface 71 to be recessed toward the inside of the vehicle.

Figure 6:
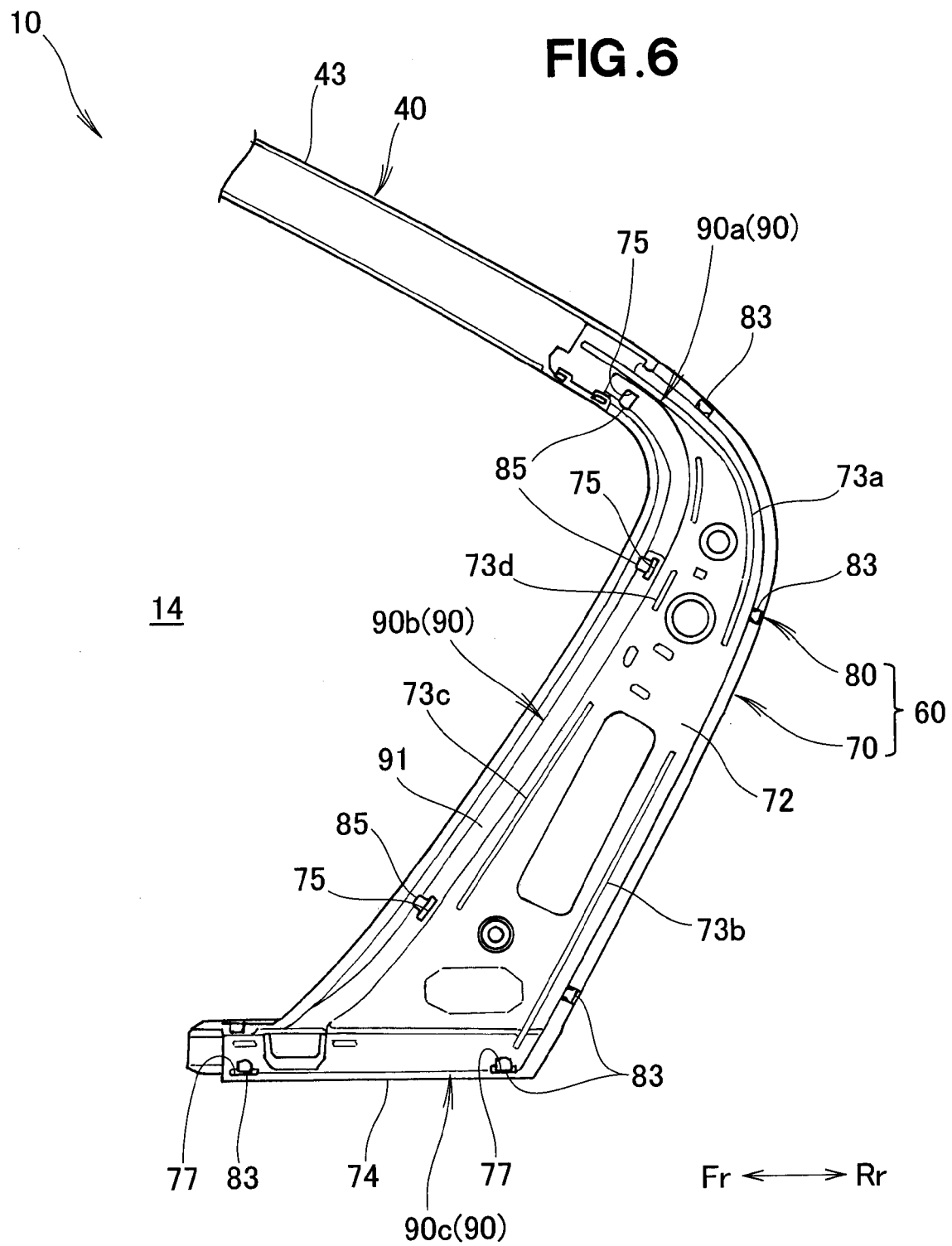
FIG. 6 is a view of the garnish with the molding of FIG. 3 as viewed from a backside thereof.

Further, as shown in FIG. 6, the garnish has a plurality of leg portions 73a to 73d formed on a backside surface 72 thereof to project toward the inside of the vehicle.

Figure 10:
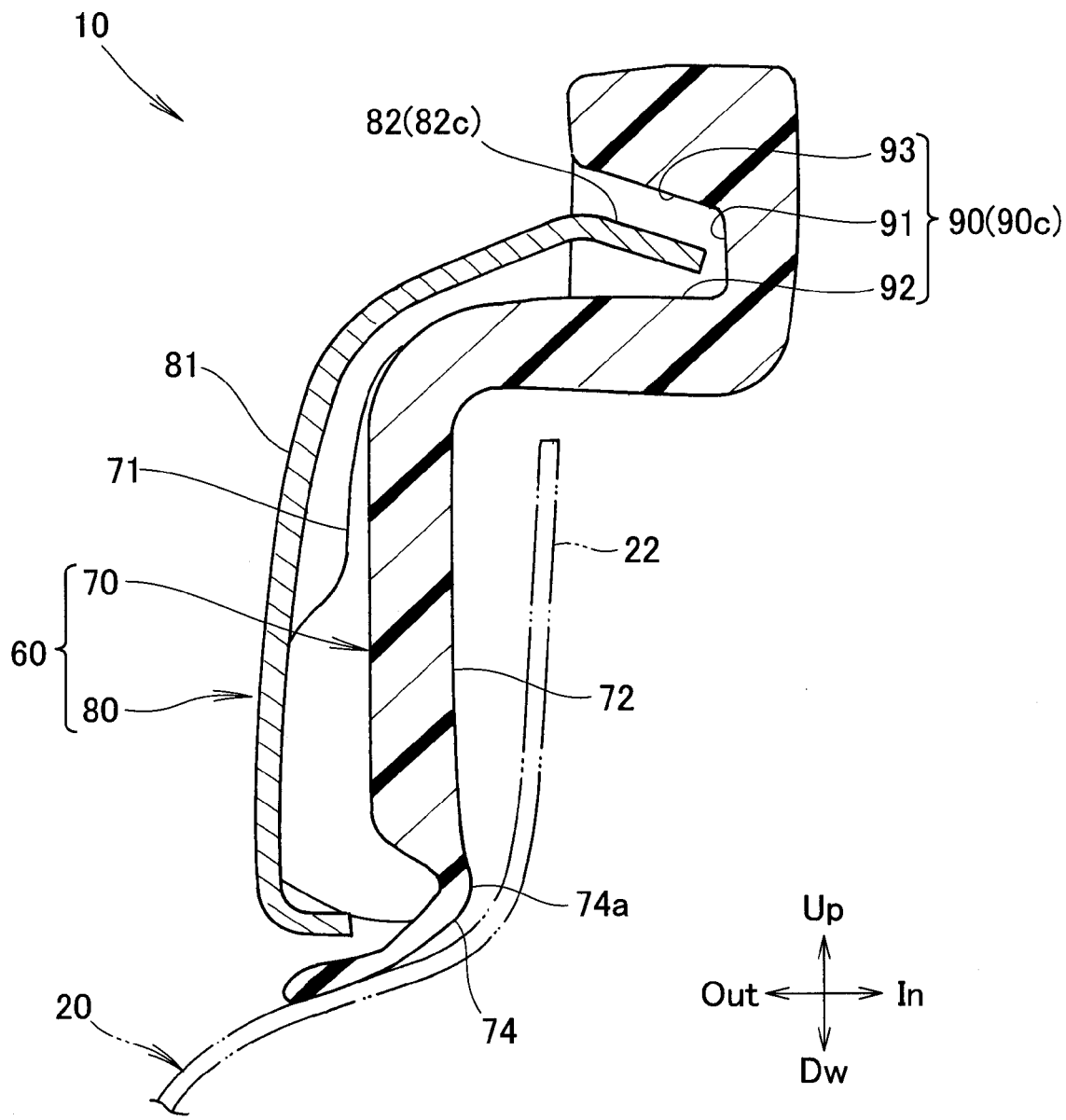
FIG. 10 is a cross-sectional view taken along line 10-10 of FIG. 3.
Figure 11:
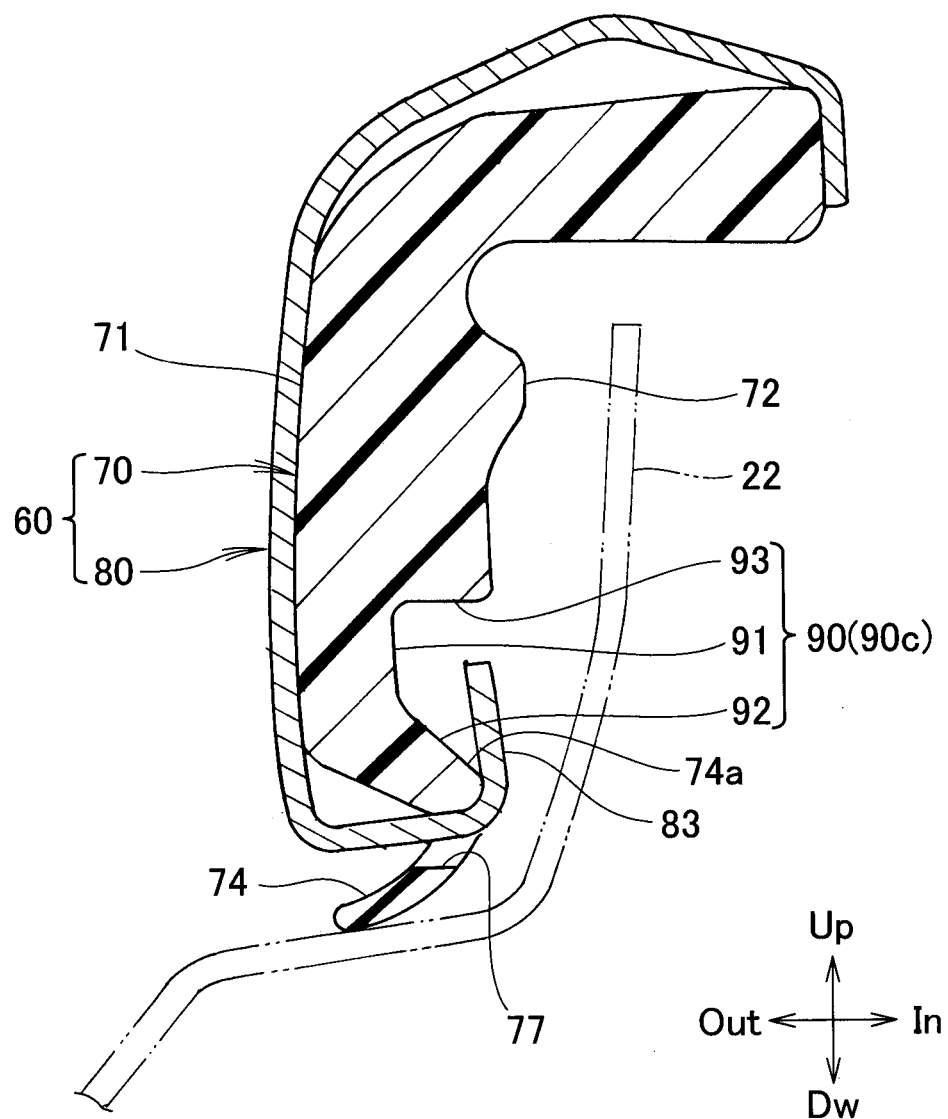
FIG. 11 is a cross-sectional view taken along line 11-11 of FIG. 3.

As shown in FIGS. 3, 10 and 11, the garnish body 70 has at a lower end thereof a garnish lip 74 formed integrally with the garnish body 70 to abut on the outer panel 22. The garnish lip 74 has a curved section 74a that is greatly curved toward the inside of the vehicle. The garnish lip 74 is formed of resin harder than the beltline lip 33 (FIG. 4), and the curved section 74a is greatly curved more than the beltline lip 33 toward the inside of the vehicle.

In this manner, the garnish lip 74 is formed integrally with the garnish body 70. By forming the garnish lip 74 integrally with the garnish body 70, the manufacturing cost of the parts can be reduced.

The garnish lip 74 has lip holes 77 formed therein for passage of the molding 80. The lip holes 77 are configured to allow parts of the molding 80 to pass therethrough and fastened thereto. Further, with the lip holes 77, the garnish lip 74 has reduced rigidity and becomes easily deflected, so that the garnish lip 74 can securely be brought into close contact with the outer panel 22.

The molding 80 is formed substantially in a U-shape as viewed from outside of the vehicle. As shown in FIG. 2, the molding 80 covers the large part of the garnish body 70, and thus the molding 80 also extends over the upper side part 52, the rear side part 53, and the lower side part 54 of the panel support frame 50.

Figure 8:
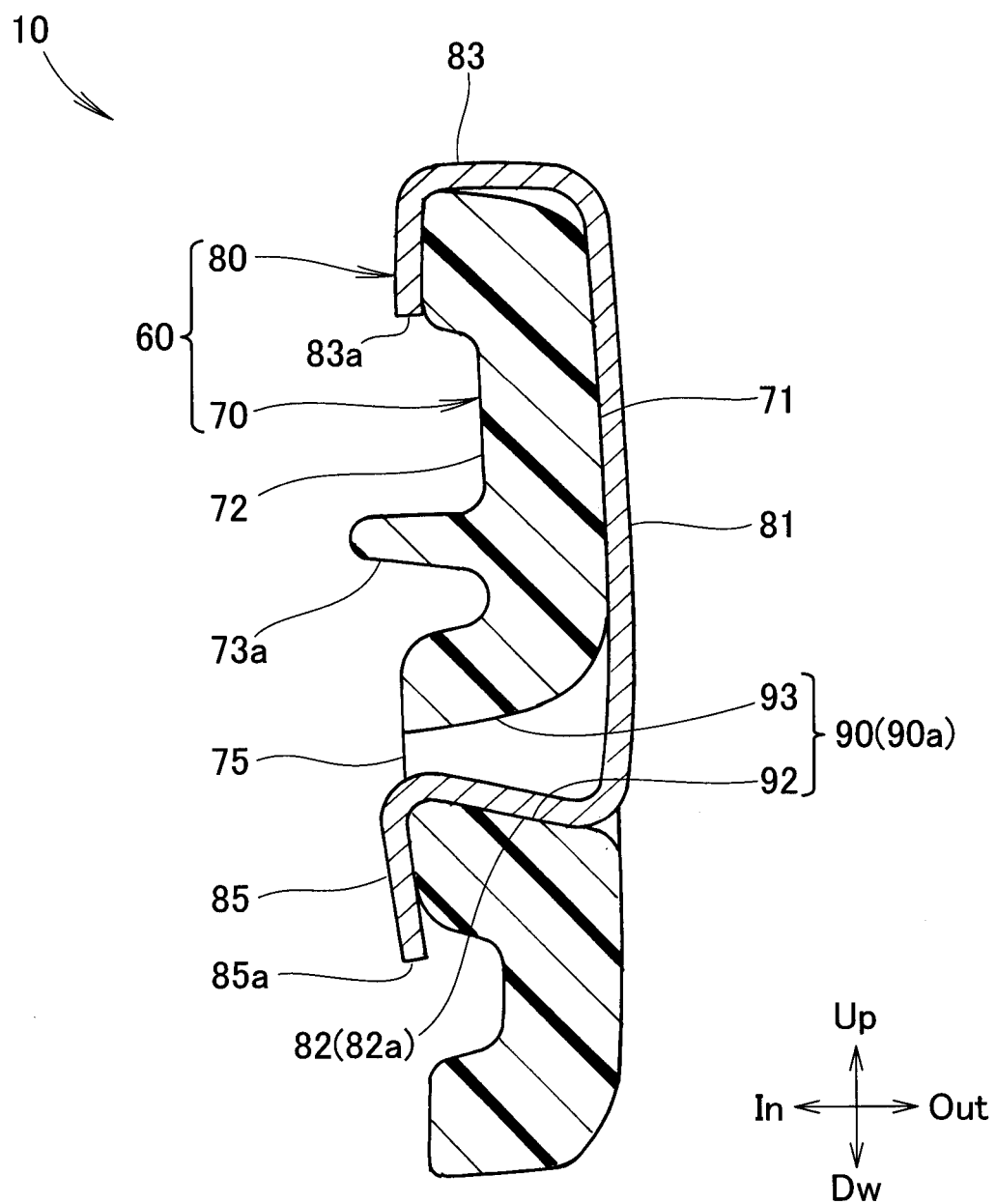
FIG. 8 is a cross-sectional view taken along line 8-8 of FIG. 3.
Figure 9:
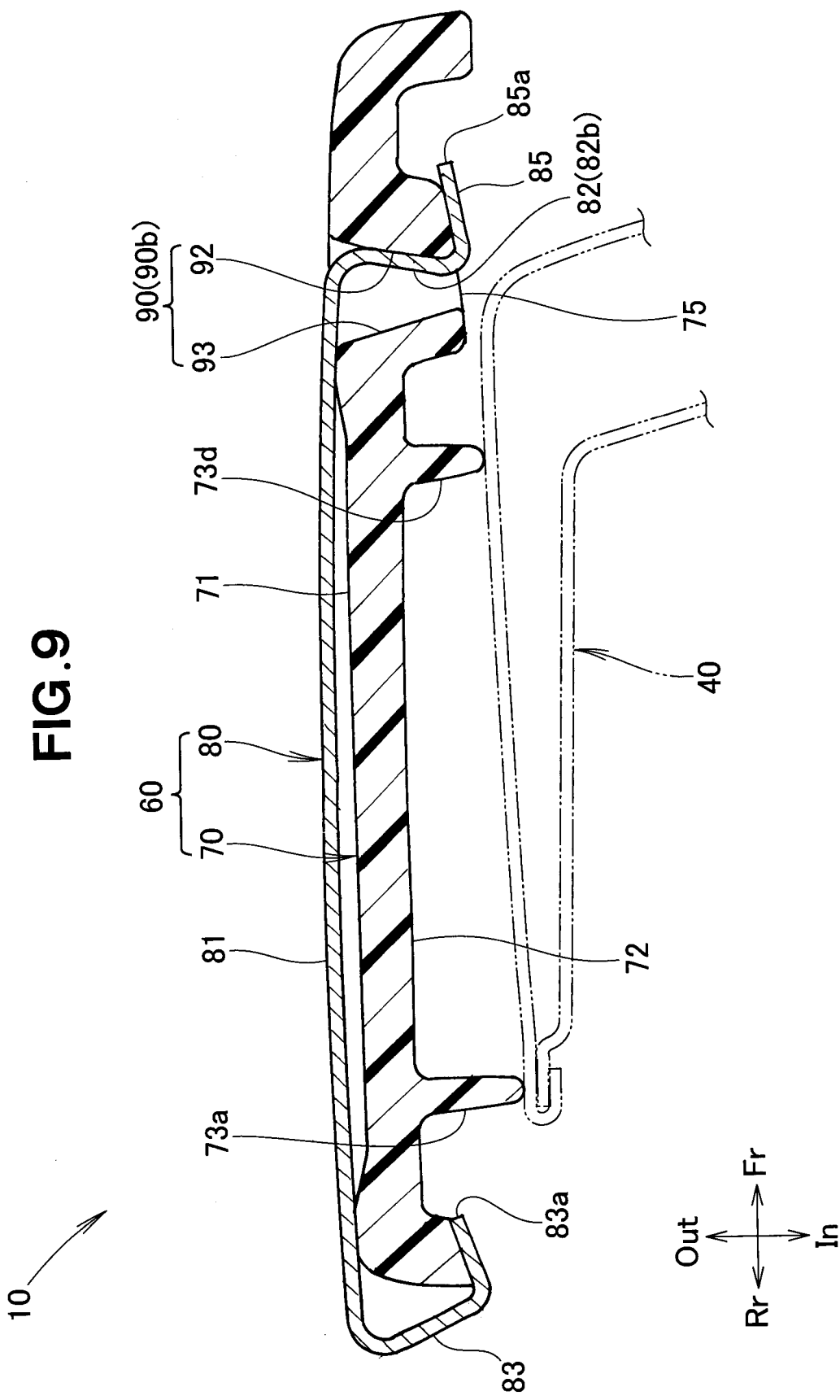
FIG. 9 is a cross-sectional view taken along line 9-9 of FIG. 3.

As shown in FIGS. 8 and 9, the molding 80 includes an obverse surface section 81 extending along the outer surface 71 of the garnish body 70 in a lengthwise direction of the garnish body 70, a flange 82 raised up from one edge in a widthwise direction of the obverse surface section 81 toward the groove 90 to be fitted in the groove 90, and fastening projections 83 formed on the obverse surface section 81 and extending from the other edge in the widthwise direction of the obverse surface section 81 toward a corresponding edge in a widthwise direction of the garnish body 70.

As shown in FIG. 5, the groove 90 is formed substantially in a U-shape to extend along the entire garnish body 70. The groove 90 extends over the upper side part 52, the rear side part 53, and the lower side part 54 of the panel support frame 50, as shown in FIG. 2. Of the groove 90, a part corresponding to the upper side part 52 of the panel support frame will be referred to as "groove upper side part 90a", a part corresponding to the rear side part 53 of the panel support frame will be referred to as "groove rear side part (groove lateral side part) 90b", and a part corresponding to the lower side part 54 of the panel support frame will be referred to as "groove lower side part 90c".

Figure 7:
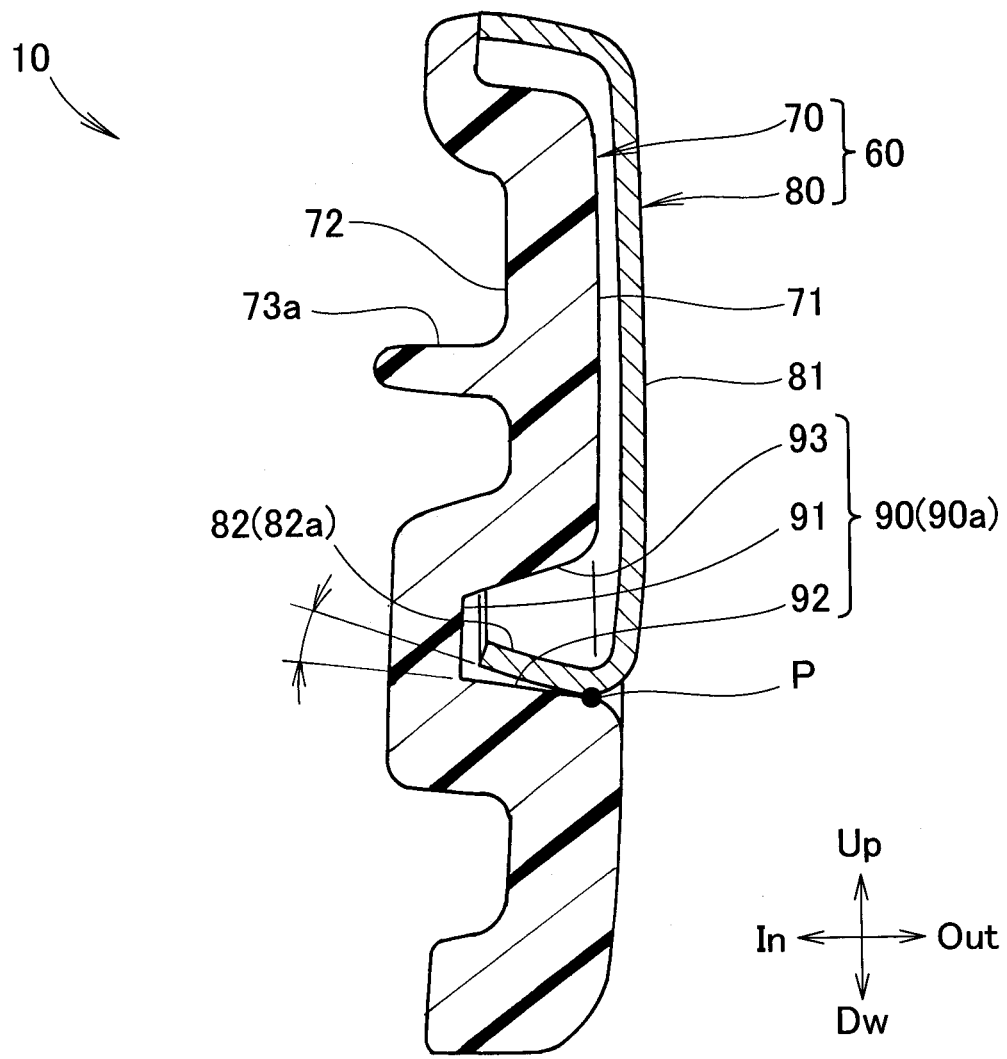
FIG. 7 is a cross-sectional view taken along line 7-7 of FIG. 3.

As shown in FIGS. 7, 8 and 9, the groove 90 is formed to have a substantially cup-shaped cross section, having a groove bottom 91, and lateral walls or side walls 92, 93 extending outward from opposite ends of the groove bottom 91. Each of the side walls 92, 93 is formed as an inclined surface inclined in a direction such that a groove width increases from the groove bottom 91 to a groove opening (or the outside of the vehicle). Hereinbelow, the side wall 92 with which the flange 82 is brought into contact will be referred to also as "inclined surface 92".

The garnish body 70 has a plurality of through-holes 75 bored therein and extending from the groove bottom 91 in a direction toward a backside surface 72 of the garnish body 70.

As shown particularly in FIG. 9, the leg portions 73a to 73d (see also FIG. 6) are formed on the backside surface 72 of the garnish body 70 to project toward the door sash 40, and have distal ends thereof abutting on the door sash 40. The leg portions 73a to 73d are each formed in the vicinity of each of the through-holes 75. Because of the through-holes 75, rigidity of the garnish body 70 is reduced. However, arranging the leg portions 73a to 73d serving as ribs in the vicinities of the through-holes 75, the rigidity can be increased.

Further, as shown in FIG. 6, the leg portions 73a and 73b are each formed to extend over the vicinities of the plurality of through-holes 75. That is, the leg portions 73a and 73b each extends over a long range. By thus forming the leg portions 73a and 73b to extend over the long ranges, the leg portions 73a and 73b can have increased strength. With the leg portions 73a and 73b having increased strength, the through-hole 75 can further be reinforced.

Particularly, the leg portion 73a is formed to extend along the groove upper side part 90a and the groove rear side part 90b. More specifically, the leg portion 73a is formed substantially in an L-shape with an arc-shaped corner where two sides meet. With the two sides extending in different directions, the leg portion 73a can have high strength against external forces applied from various directions.

As shown in FIGS. 8 to 10, the flange 82 has a flange upper side part 82a as a part corresponding to the upper side part 52 (FIG. 2) of the panel support frame, a flange rear side part (or molding lateral side part) 82b as a part corresponding to the rear side part 53 of the panel support frame, and a flange lower side part 82c as a part corresponding to the lower side part 54 of the panel support frame.

The flange 82 has projections 85 integrally formed at an edge thereof to pass through the through-holes 75 and project beyond the backside surface 72 of the garnish body 70. The projections 85 are each clinched to the backside surface 72 of the garnish body 70. The projections 85 are arranged at a plurality of positions with intervals along the edge of the flange 82.

With this configuration, the flange 82 can be prevented from being lifted, and stably fixed in the groove 90. Therefore, the occurrence of a gap can be surely prevented. Further, the flange 82 can be clinched at positions other than an end part of the garnish body 70.

Each of the projections 85 has a distal end bent along the backside surface 72 of the garnish body 70 in a direction toward the inclined surface 92. With the projections 85 being bent toward the inclined surface 92, the flange 82 can be expanded toward the inclined surface 92, whereby the occurrence of a gap between the inclined surface 92 and the flange 82 can be efficiently prevented.

Each of the fastening projections 83 has a distal end clinched to the garnish body 70 by being bent along the backside surface 72 of the garnish body 70 in a direction same as that in which the projections 85 are bent in clinching. In other words, the projections 85 and the fastening projections 83 are bent in the same direction with each other. With this configuration, the projections 85 and the fastening projections 83 can be clinched at the same time, which leads to improved productivity.

As shown in FIGS. 3, 7 and 10, at an upper part of the molding 80, the molding 80 is in contact with the inclined surface 92 of the groove upper side part 90a at a position adjacent to a boundary between the flange upper side part 82a and the obverse surface section 81 (FIG. 7). On the other hand, as shown in FIG. 10, at a lower part of the molding 80, the flange lower side part 82c is not in contact with the inclined surface 92 of the groove lower side part 90c. The flange lower side part 82c is located below the inclined surface 92 of the groove lower side part 90c.

At the upper part of the molding 80, the molding 80 is in contact with the groove upper side part 90a at a contact point P. A distance from the contact point P to the inclined surface 92 at the lower part is smaller than a distance from the contact point P to the molding 80 at the lower part. In other words, a distance from the flange upper side part 82a to the flange lower side part 82c is set to be greater than a distance from the groove upper side part 90a to the groove lower side part 90c.

The flange 82 is formed to be slightly longer than the groove 90. Since the flange 82 is an elastic member, the flange 82 can be fitted in the groove 90 even when the flange 82 is formed to be longer than the groove 90. By thus forming the flange 82 to be longer than the groove 90, a product dimensional error that inevitably occurs can be absorbed.

Further, the flange upper side part 82a is in contact with the groove upper side part 90a. When the entire flange 82 cannot be brought into contact with the entire groove 90 due to an inevitable product dimensional error, the flange upper side part 82a is brought into contact with the groove upper side part 90a. It is thereby possible to prevent the occurrence of a gap at the upper side parts that are conspicuous, while absorbing the product dimensional error at the lower side parts that are less conspicuous.

Figure 12:
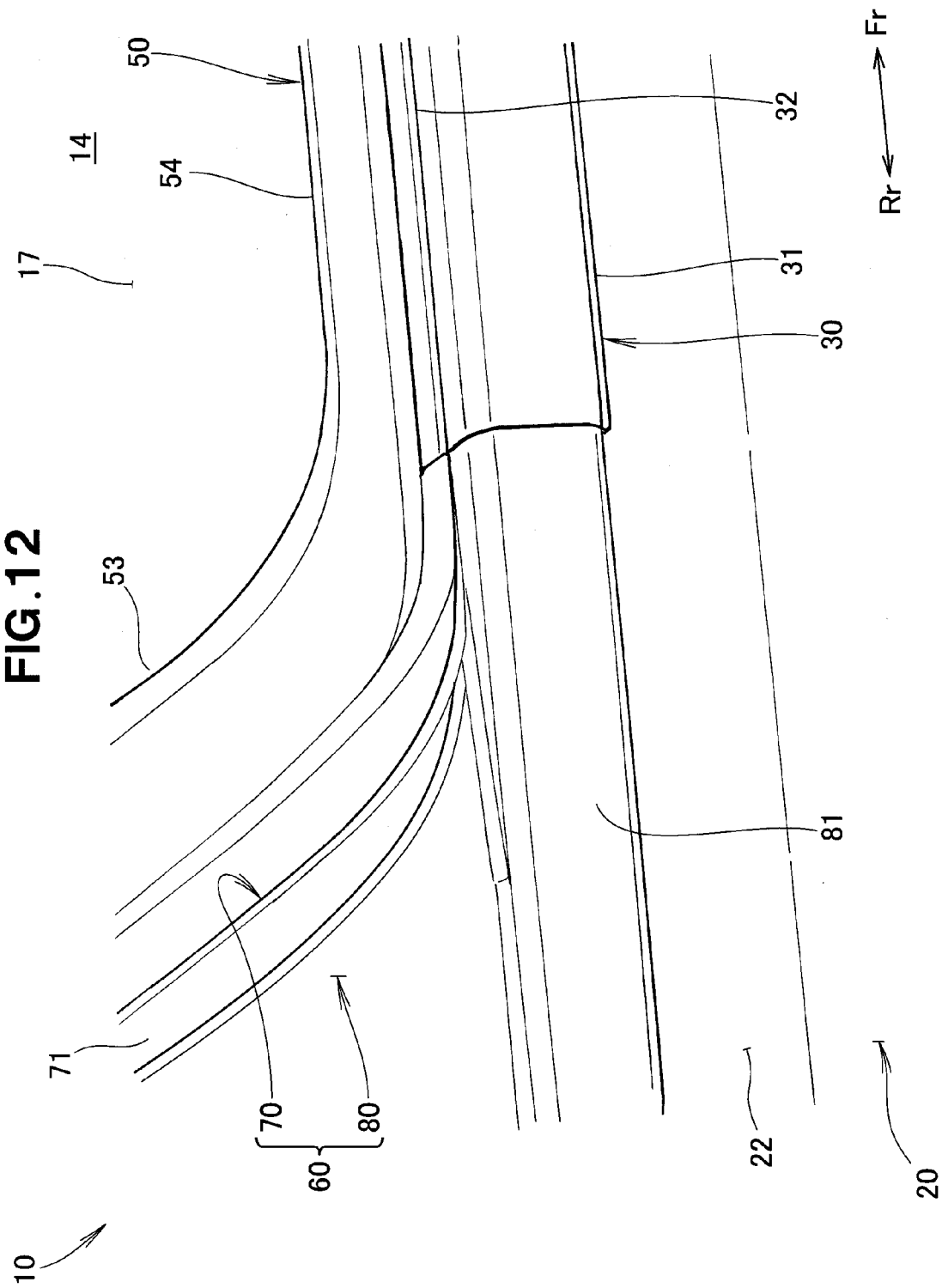
FIG. 12 is a perspective view showing a positional relationship between the molding, the garnish body, a beltline molding, and a panel support frame.
Figure 13:
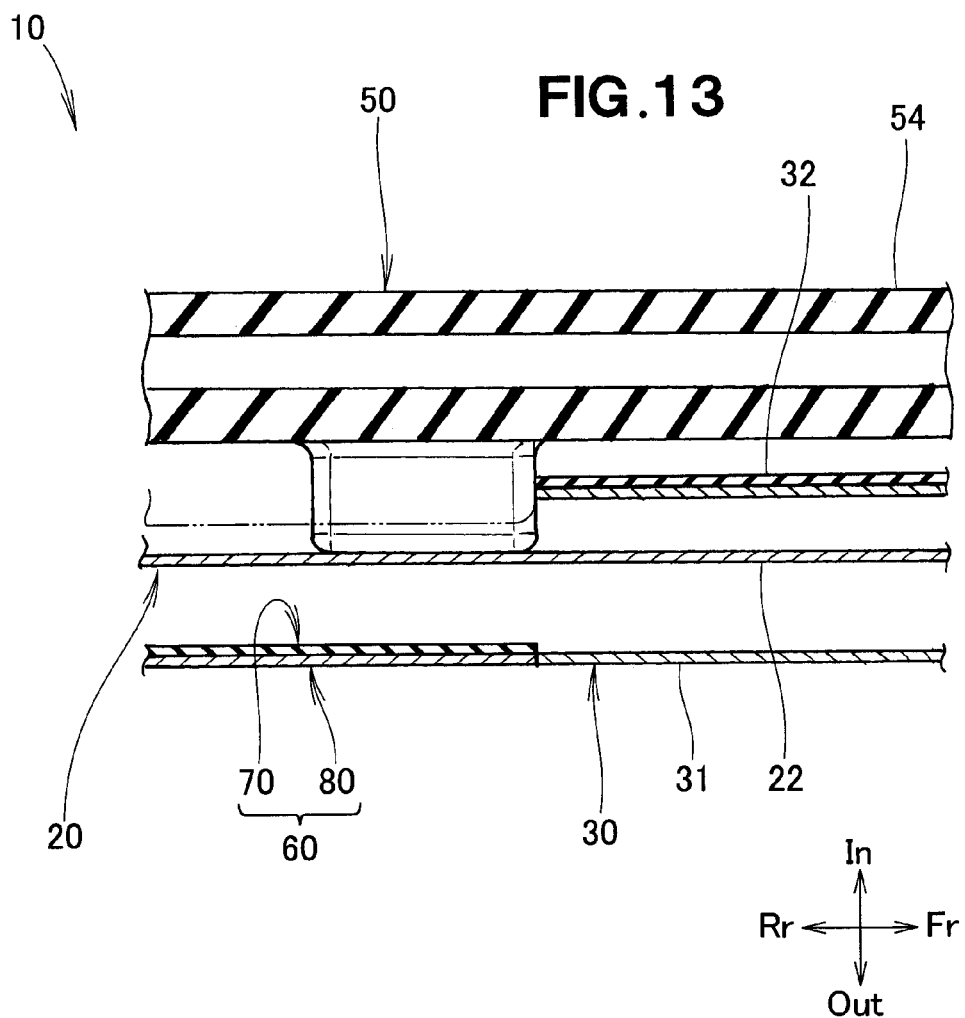
FIG. 13 is a cross-sectional view taken along line 13-13 of FIG. 4.

As shown in FIGS. 12 and 13, a distal end of the flange lower side part 82c (a distal end of the lower part of the molding 80) and a distal end of the beltline molding 30 are butted to each other. An outer surface of the molding 80 and the outer surface of the beltline molding 30 are made flush with each other, and the garnish 60 with the molding can thereby have an enhanced external appearance.

Figure 14:
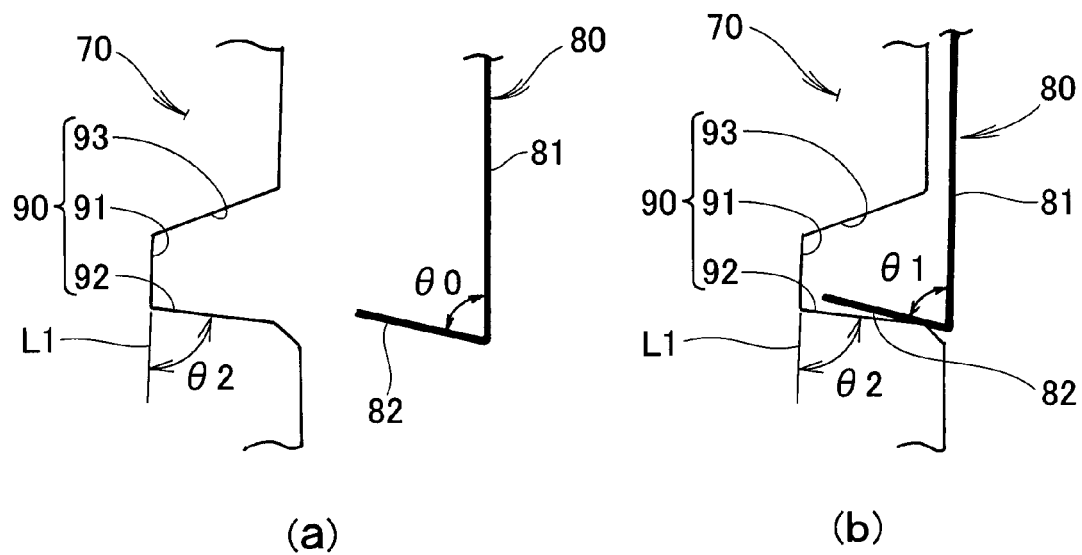
FIG. 14 is a view illustrative of the manner in which the molding is fitted in a groove of FIG. 7.

As shown in FIG. 14(a), the molding 80 is forcibly fitted to the garnish body 70. In a state before the molding 80 is fitted, the obverse surface section 81 and the flange 82 form an angle θ0, and an extension line L1 of the groove bottom 91 and the inclined surface 92 form an angle θ2.

As shown in FIG. 14(b), in a state after the molding 80 is fitted, the obverse surface section 81 and the flange 82 form an angle θ1. The angle θ1 is smaller than the angle θ0 before the molding 80 is fitted. Further, the angle or first angle θ1 is smaller than the angle or second angle θ2. Namely, the first angle θ1 formed by the obverse surface section 81 and the flange 82 is set to be smaller than the second angle θ2 formed by the extension line L1 of the groove bottom 91 and the inclined surface 92. On the other hand, the angle θ0 before the molding 80 is fitted may be greater than the second angle θ2, as far as the angle becomes smaller than the second angle θ2 after the molding 80 is fitted.

As shown in FIG. 7, since the first angle θ1 is smaller, the molding 80 is in contact with the groove 90 at a position adjacent to a boundary between the flange 82 and the obverse surface section 81. In other words, the flange 82 is in contact with the inclined surface 92 at a position adjacent to a base end of the flange 82, so that the molding 80 will not easily be lifted by a restoration force of the flange 82. By thus preventing the molding 80 from being lifted, the occurrence of a gap between the molding 80 and the groove 90 can be prevented. As a result, the garnish 60 with the molding can have an enhanced external appearance with no occurrence of the gap.

Although the embodiment has been explained in the case of the rear right door of the vehicle, however, it is not so limited, and the present invention may be applied to a rear left door or any other door on the vehicle.

Further, although the embodiment has been explained in the case of the swing type door, however, it is not so limited, and the present invention may be applied to a slide type door or other type vehicle doors.

INDUSTRIAL APPLICABILITY

The present invention is suitably used for doors mounted on rear lateral side parts of vehicles.

REFERENCE CHARACTERS

10 . . . vehicle door, 20 . . . door body, 22 . . . outer panel, 30 . . . beltline molding, 33 . . . beltline lip, 40 . . . door sash, 50 . . . panel support frame, 52 . . . upper side part of the panel support frame, 53 . . . rear side part (lateral side part) of the panel support frame, 54 . . . lower side part of the panel support frame, 60 . . . garnish with a molding, 70 . . . garnish body, 71 . . . outer surface, 72 . . . backside surface, 74 . . . garnish lip, 74a . . . curved section, 75 . . . through-hole, 80 . . . molding, 81 . . . obverse surface section, 82 . . . flange, 82a . . . flange upper side part, 82c . . . flange lower side part, 83 . . . fastening projection, 85 . . . projection, 90 . . . groove, 90a . . . groove upper side part, 90c . . . groove lower side part, 91 . . . groove bottom, 92 . . . side wall (inclined surface), 93 . . . side wall, θ1 . . . first angle, θ2 . . . second angle, L1 . . . extension line

The invention claimed is:

1. A garnish including a garnish body and a metal molding overlapping an outer surface of the garnish body, wherein:
   the garnish body has a groove formed on the outer surface to extend in a lengthwise direction of the garnish body;
   at least one of opposite side walls of the groove is formed as an inclined surface inclined in a direction such that a groove width increases from a groove bottom to a groove opening;
   the metal molding has an obverse surface section extending along the outer surface of the garnish body in the lengthwise direction of the garnish body, and a flange raised up from one edge in a widthwise direction of the obverse surface section toward the groove to be fitted in the groove and brought into contact with the inclined surface;
   a first angle formed by the obverse surface section and the flange is set to be smaller than a second angle formed by an extension line of the groove bottom and the inclined surface; and
   in a state that the flange of the metal molding is pushed and fitted in the groove of the garnish body, the flange is pressed and elastically deformed by the inclined surface of the groove so that the obverse surface of the flange at a position adjacent to a base end of the flange is in contact with the inclined surface of the groove at a position adjacent to the groove opening, the elastic deformation of the flange causing the first angle before the metal molding is fitted in the groove to be changed so that the first angle is smaller than the second angle in the state that the flange of the metal molding is pushed and fitted in the groove of the garnish body.

2. The garnish with the molding of claim 1, wherein the garnish body has a through-hole bored therein in a direction from the groove bottom to a backside surface of the garnish body, and wherein the flange has a projection formed on at least part thereof to pass through the through-hole and project beyond the backside surface of the garnish body, and the projection is clinched to the backside surface of the garnish body.

3. The garnish with the molding of claim 2, wherein the projection is clinched to the backside surface of the garnish body in a manner such that a distal end of the projection is bent along the backside surface of the garnish body in a direction toward the inclined surface.

4. The garnish with the molding of claim 3, wherein the metal molding further has a fastening projection formed on the obverse surface section and extending from another edge in the widthwise direction of the obverse surface section toward a corresponding edge in a widthwise direction of the garnish body, and wherein a distal end of the fastening projection extends from the edge of the garnish body to the backside surface of the garnish body and is clinched to the garnish body by being bent along the backside surface of the garnish body in a direction same as the direction in which the projection is bent in clinching.

5. A vehicle door provided with the garnish of claim 2, wherein:
   the vehicle door includes a door body, and a door sash attached above the door body;
   the door sash is provided with a panel support frame joined to an upper part of the door body to support a window panel;
   the garnish body is mounted on a surface of the panel support frame;
   the panel support frame has a lower side part extending along an upper edge of the door body, a lateral side part extending upward from an end of the lower side part, and an upper side part extending from an upper end of the lateral side part in the same direction as the lower side part;
   the groove extends over the lower side part, the lateral side part and the upper side part of the panel support frame;
   the groove has a groove lower side part corresponding to the lower side part of the panel support frame, and a groove upper side part corresponding to the upper side part of the panel support frame;
   the flange has a flange lower side part corresponding to the groove lower side part, and a flange upper side part corresponding to the groove upper side part;
   a distance from the flange upper side part to the flange lower side part is set to be greater than a distance from the groove upper side part to the groove lower side part; and
   the flange upper side part is in contact with the groove upper side part.

6. The vehicle door provided with the garnish of claim 5, further including a beltline molding attached along the upper edge of the door body, and an outer panel forming an outside part of the door body, wherein a distal end of the flange lower side part and a distal end of the beltline molding are butted to each other, wherein the beltline molding is provided with at a lower edge thereof a beltline lip formed to abut on the outer panel, wherein the garnish body has at a lower end thereof a garnish lip formed integrally with the garnish body to abut on the outer panel, and wherein the garnish lip is formed of resin harder than the beltline lip, and has a curved section that is greatly curved more than the beltline lip toward the inside of a vehicle.

7. A vehicle door provided with the garnish of claim 3, wherein:
the vehicle door includes a door body, and a door sash attached above the door body;
the door sash is provided with a panel support frame joined to an upper part of the door body to support a window panel;
the garnish body is mounted on a surface of the panel support frame;
the panel support frame has a lower side part extending along an upper edge of the door body, a lateral side part extending upward from an end of the lower side part, and an upper side part extending from an upper end of the lateral side part in the same direction as the lower side part;
the groove extends over the lower side part, the lateral side part and the upper side part of the panel support frame;
the groove has a groove lower side part corresponding to the lower side part of the panel support frame, and a groove upper side part corresponding to the upper side part of the panel support frame;
the flange has a flange lower side part corresponding to the groove lower side part, and a flange upper side part corresponding to the groove upper side part;
a distance from the flange upper side part to the flange lower side part is set to be greater than a distance from the groove upper side part to the groove lower side part; and
the flange upper side part is in contact with the groove upper side part.

8. The vehicle door provided with the garnish of claim 7, further including a beltline molding attached along the upper edge of the door body, and an outer panel forming an outside part of the door body, wherein a distal end of the flange lower side part and a distal end of the beltline molding are butted to each other, wherein the beltline molding is provided with at a lower edge thereof a beltline lip formed to abut on the outer panel, wherein the garnish body has at a lower end thereof a garnish lip formed integrally with the garnish body to abut on the outer panel, and wherein the garnish lip is formed of resin harder than the beltline lip, and has a curved section that is greatly curved more than the beltline lip toward the inside of a vehicle.

9. A vehicle door provided with the garnish of claim 4, wherein:
the vehicle door includes a door body, and a door sash attached above the door body;
the door sash is provided with a panel support frame joined to an upper part of the door body to support a window panel;
the garnish body is mounted on a surface of the panel support frame;
the panel support frame has a lower side part extending along an upper edge of the door body, a lateral side part extending upward from an end of the lower side part, and an upper side part extending from an upper end of the lateral side part in the same direction as the lower side part;
the groove extends over the lower side part, the lateral side part and the upper side part of the panel support frame;
the groove has a groove lower side part corresponding to the lower side part of the panel support frame, and a groove upper side part corresponding to the upper side part of the panel support frame;
the flange has a flange lower side part corresponding to the groove lower side part, and a flange upper side part corresponding to the groove upper side part;
a distance from the flange upper side part to the flange lower side part is set to be greater than a distance from the groove upper side part to the groove lower side part; and
the flange upper side part is in contact with the groove upper side part.

10. The vehicle door provided with the garnish of claim 9, further including a beltline molding attached along the upper edge of the door body, and an outer panel forming an outside part of the door body, wherein a distal end of the flange lower side part and a distal end of the beltline molding are butted to each other, wherein the beltline molding is provided with at a lower edge thereof a beltline lip formed to abut on the outer panel, wherein the garnish body has at a lower end thereof a garnish lip formed integrally with the garnish body to abut on the outer panel, and wherein the garnish lip is formed of resin harder than the beltline lip, and has a curved section that is greatly curved more than the beltline lip toward the inside of a vehicle.

* * * * *